INVENTOR.
RODNEY E. CHRISTIAN
BY
Whittemore Hulbert + Belknap
ATTORNEYS

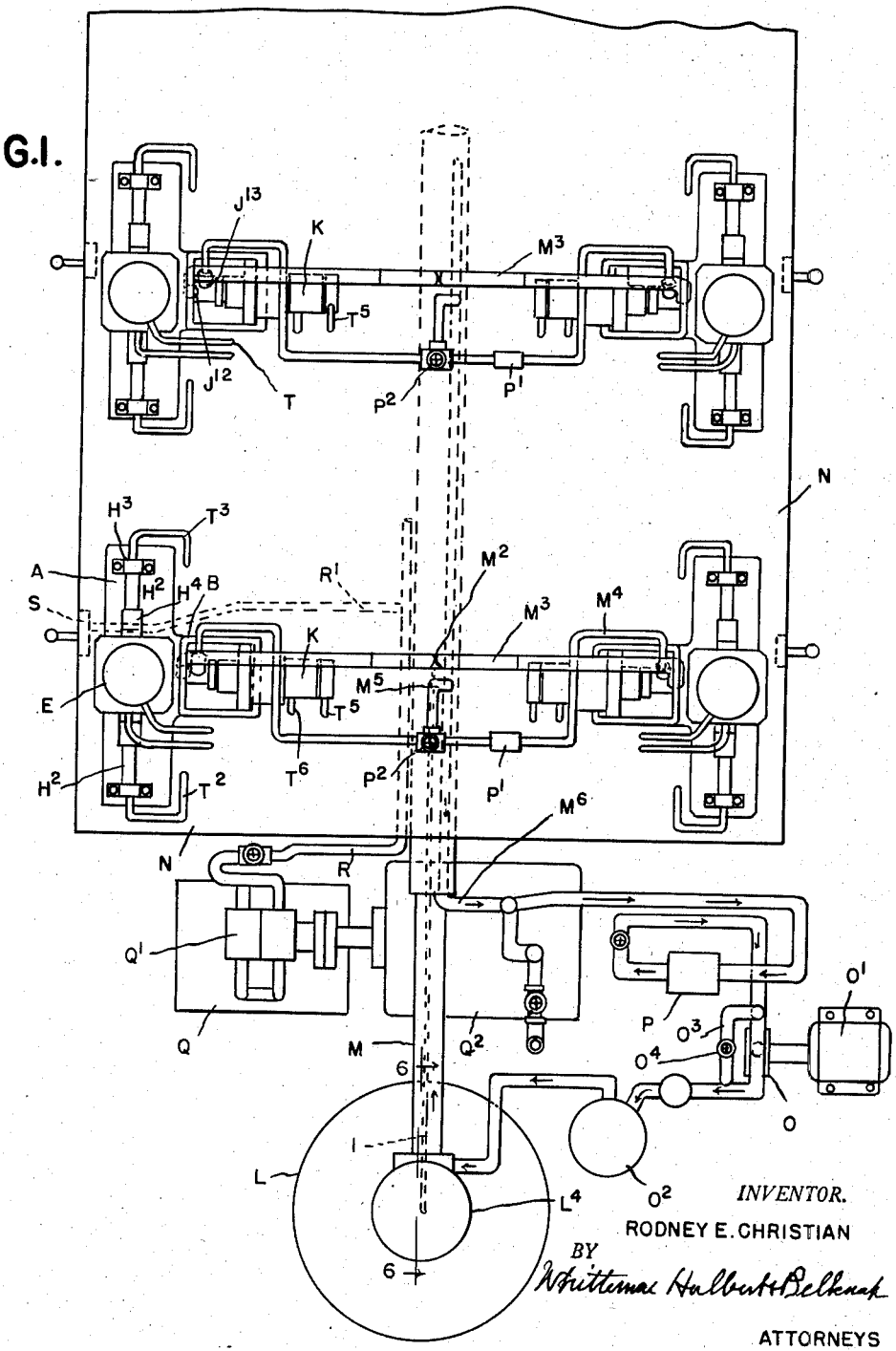

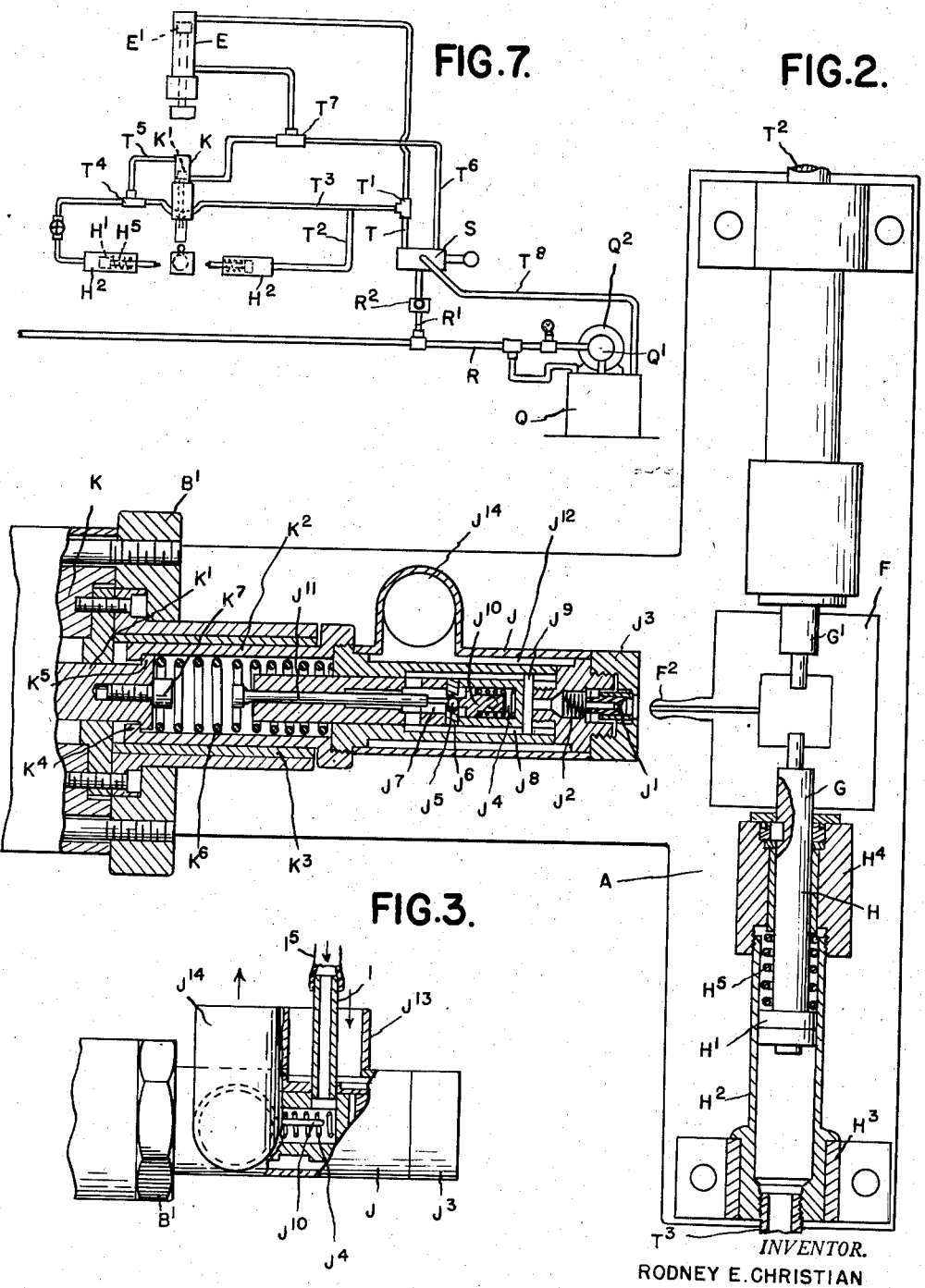
April 13, 1948. R. E. CHRISTIAN 2,439,506
APPARATUS FOR MOLDING ARTICLES OF WAX
Filed May 28, 1945 4 Sheets-Sheet 2
INVENTOR.
RODNEY E. CHRISTIAN
BY
Whittemore Hulbert + Belknap
ATTORNEYS April 13, 1948.   R. E. CHRISTIAN   2,439,506
APPARATUS FOR MOLDING ARTICLES OF WAX
Filed May 28, 1945   4 Sheets-Sheet 3

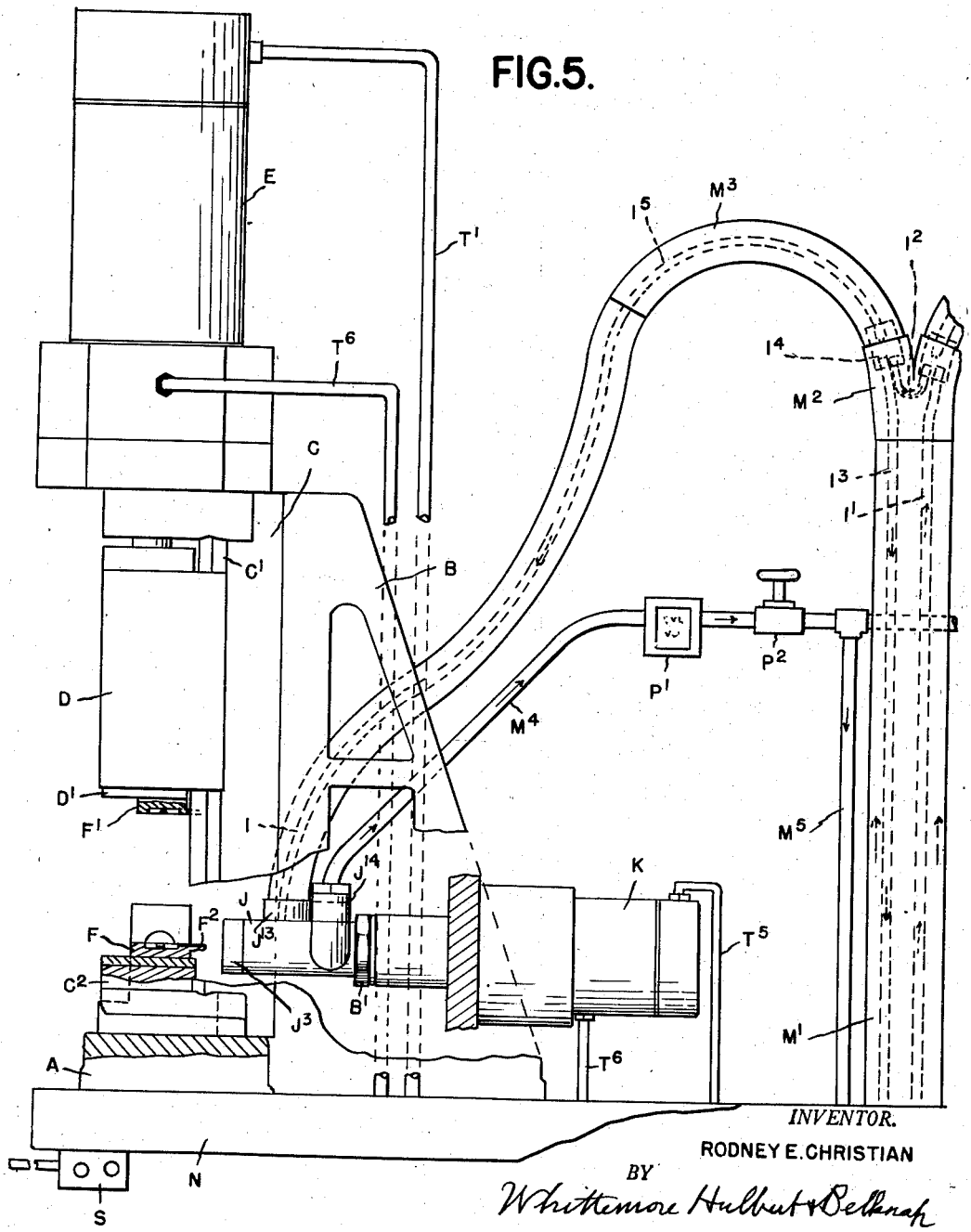

Patented Apr. 13, 1948

2,439,506

UNITED STATES PATENT OFFICE 2,439,506

APPARATUS FOR MOLDING ARTICLES OF WAX

Rodney E. Christian, Royal Oak, Mich., assignor to Kerr Manufacturing Co., a corporation of Michigan Application May 28, 1945, Serial No. 596,180

3 Claims. (Cl. 18—30)

The invention relates to the manufacture of articles of wax or other relatively low fusing material and has more particular reference to the manufacture of wax patterns for use in forming molds.

It is one of the objects of the invention to obtain a construction in which similar wax articles can be molded in rapid succession from a single set of dies.

It is a further object to obtain a construction in which a series of molding machines may be simultaneously operated and are supplied with material from a common source. With these objects in view the invention consists, first, in the construction of an individual molding machine; second, in a system of distribution for the wax or other molding material adapted to simultaneously supply a series of molding machines with said material in proper condition for molding; and, third, in various features of construction as hereinafter set forth.

In the drawings:

Fig. 1 is a plan view of a series of molding machines together with a system for distributing the molding material thereto;

Fig. 2 is a plan view partly in horizontal section of an individual molding machine;

Fig. 3 is a vertical section partly in elevation of a portion of Fig. 2;

Fig. 5 is a sectional side elevation thereof;

Fig. 7 is a diagram of the hydraulic system for operating the fluid motors.

General system

Figure 4:
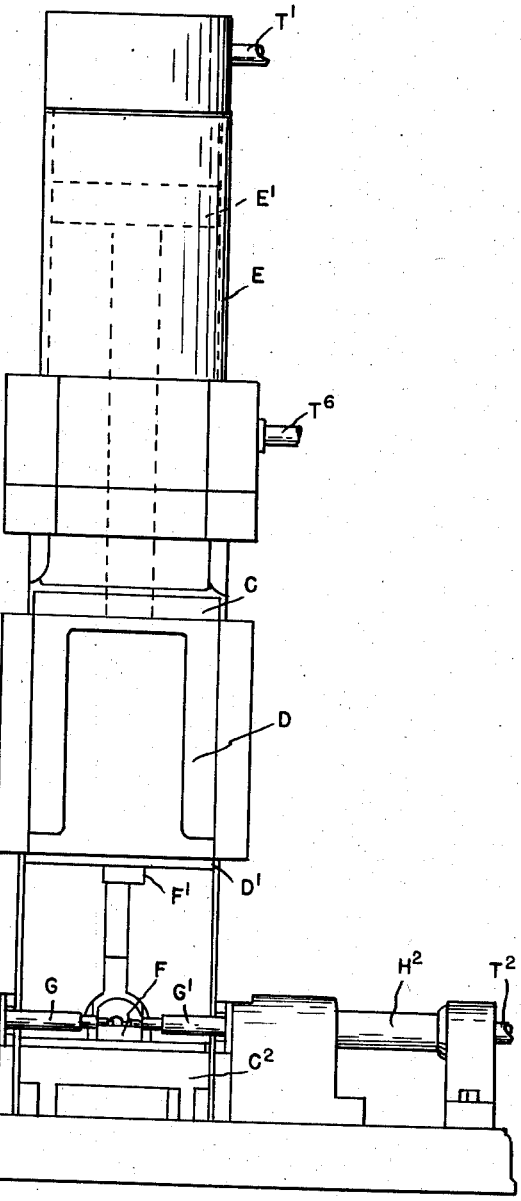
Fig. 4 is a front elevation of the molding machine.
Figure 6:
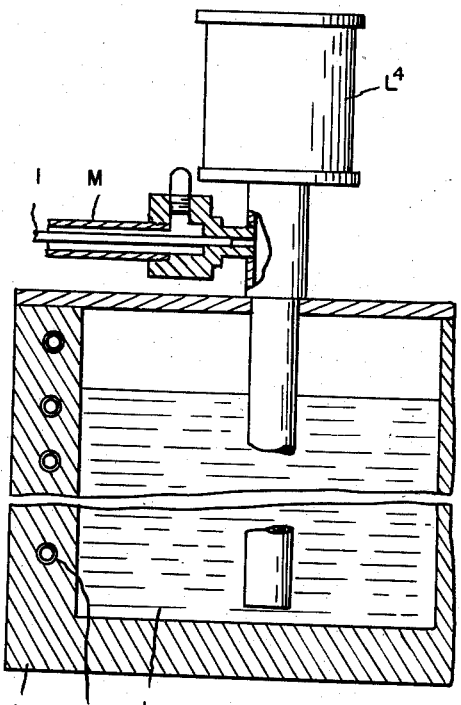
Fig. 6 is an enlarged sectional elevation substantially on line 6—6, Fig. 1.

The material from which the patterns or other articles are molded is preferably one which is rigid at normal temperatures but, nevertheless, has a relatively low melting point. For instance, a wax may have a melting temperature considerably less than the boiling point of water but will solidify at a temperature of 140° F. or thereabouts. Furthermore, the range of temperature between a condition of rigidity and a condition sufficiently plastic to flow is relatively small. Thus, if the material is to be distributed to the different machines through conduits, its temperature must be maintained substantially constant.

In view of the condition just described, we have devised a system of distribution in which the wax or like material is fed through a conduit extending from the source of supply to the several molding machines, said conduit being enclosed throughout its extent in another conduit containing a fluid medium. The latter conduit is connected into a circuit through which the fluid is propelled at a fairly rapid rate and which includes a heater at one point. The outer conduit is preferably surrounded with heat insulating material so that the drop in temperature of the fluid in completing its circuit (due to external heat loss) is relatively small. Also, by regulating the speed of circulation this temperature drop may be maintained the same under varying external temperatures. The system, therefore, comprises the following essential elements, first, a source of supply for the wax or other molding material; second, a pump for propelling the wax through its distributing conduit and for maintaining a substantially constant pressure thereon whether flowing or in a static condition; third, a conduit surrounding the wax holding conduit and containing a fluid medium, such as water; fourth, a return circuit for the latter conduit; fifth, means for propelling the fluid through the outer conduit at a predetermined rate; and, sixth, means for heating the fluid at one point in it circuit to a predetermined temperature. This system may be extended to supply the wax to any number of separate molding machines. Preferably these molding machines are arranged in pairs on opposite sides of the main distributing conduits and are supplied therefrom by branch conduits. However, the arrangement is such as to include all of the outer branch conduits in the general circulating system, while all of the inner branch conduits supply the wax under equal pressure to the separate machines.

Molding machine

Each molding machine is of the following construction. A is a base shown as of T-shaped form and provided with a bifurcated standard B rising from the stem portion of the T. Secured to the front of the standard B is a member C providing slideways C' for a cross head D. On the top of the member C there is mounted a hydraulic cylinder E, the piston E' of which is connected to the cross head D. At the lower end of the member C is a shelf C² on which an exchangeable mold is placed. This mold is formed in two sections F and F', the lower section F being secured to the shelf C². The upper section F' is attached to the cross head D by a depending member D'. Thus, movement of the piston E' in the cylinder E will raise and lower the cross head D imparting a corresponding movement to the member D' and section F' of the mold. On opposite sides of the member C and mounted on the head portion of the T-shaped base are laterally movable core carrier plungers G and G'. These plungers are attached to piston rods H of pistons H' engaging hydraulic cylinders $H^2$, which latter are mounted on members $H^3$, $H^4$ rising from the base. Within each cylinder $H^2$ is a spring $H^5$ surrounding the piston rod H and normally holding the piston at the outer end of its stroke within the cylinder. The piston is actuated by the pressure of hydraulic fluid which overcomes the resistance of the spring and moves the plunger G inward towards the mold. Thus, if the mold is of a character requiring the use of cores, the latter are secured to the plungers G and at the proper time in the operation of the machine, are inserted within the mold and subsequently withdrawn therefrom.

Mold filling means

As previously described, the wax or other material to be molded is delivered to each of a series of molding machines at a temperature which renders it plastic. The supply conduit I for the wax is connected to a hollow member J, which latter is slidably mounted on a cross portion B' of the bifurcated standard B and projects therefrom into proximity to the mold. At the forward end of the member J is a socket coupling J' for forming a sealing engagement with a nipple $F^2$ on the mold when pressed against the latter. The member J' is yieldably pressed forward by a spring $J^2$ against a centrally apertured cap $J^3$ threadedly secured to the member J. The conduit I is directly connected to an inner chamber $J^4$ in the member J which is normally closed by a valve $J^5$ in a ported partition $J^6$ from a chamber $J^7$. The latter is connected by an annular passage $J^8$ to a chamber $J^9$ which is in communication with the socket coupling J'. A spring pressed member $J^{10}$ normally holds the valve $J^5$ to its seat but a rod $J^{11}$ when actuated will unseat said valve thereby establishing communication between the chamber $J^4$ and the coupling J'. A water jacket $J^{12}$ surrounding the member J maintains said member at the proper temperature. For actuating the member J to engage the socket J' with the nipple $F^2$, a hydraulic cylinder K is mounted on the portion B' of the standard B. K' is a piston in the cylinder K which is connected through the medium of a sleeve member $K^2$ with the member J. This sleeve member is slidable within a supporting bearing $K^3$ and has a lost motion connection with the piston K' formed by an inwardly extending annular flange $K^4$ engaging a collar $K^5$ at the outer end of the piston. A spring $K^6$ within the sleeve member $K^2$ bearing with its opposite ends against the piston K' and the member J normally holds the flange $K^4$ in engagement with the collar $K^5$. Thus, forward movement of the piston will be communicated to the member J through the spring $K^6$ but when the coupling J' engages the nipple $F^2$, further movement of the piston K' will merely compress said spring. At the forward end of the piston K' is a tappet $K^7$ which in the continued movement of the piston will impinge upon the rod $J^{11}$ thereby unseating the valve $J^5$. Thus, to summarize, forward movement of the piston K' will first move the member J so as to engage the socket J' with the nipple $F^2$. A further movement of the piston K' will cause the tappet $K^4$ to operate the rod $J^{11}$ unseating the valve $J^5$ and permitting the wax to flow from the chamber $J^4$ to the chamber $J^7$ through the annular passage $J^8$ to the chamber $J^9$ and from the latter through the coupling and nipple into the mold.

Wax supplying system

As previously described, the wax is conveyed to the molding machines through a conduit system, the detailed construction of which is as follows. L is a container for the wax or other like material which is surrounded by a jacket L' and is provided with heating means therein, such as an electrical resistor coil $L^2$. At the top of the container L is a pump $L^4$ which withdraws the wax in fluid state and propels it through a conduit I. The conduit I is enclosed within a jacket conduit M for the fluid heating medium, such as water, and both extend successively to all of the molding machines of the series. These machines are preferably arranged in pairs along opposite sides of a table N in convenient position for operation by attendants. The main distributing conduit preferably extends longitudinally centrally beneath the table N and branches extend upward therefrom through the table between the machines of each pair. Each of these branches has an outer jacket conduit M' preferably provided at its upper end with a Y-fitting $M^2$. Hose connections $M^3$ from the branches of the Y extend to the jackets $J^{12}$ of the respective machines. These jackets have nipples $J^{13}$ and $J^{14}$, the first being connected to the hose $M^3$ and the second to a hose $M^4$ leading to a vertical conduit $M^5$ extending downward through the table and connecting with a return conduit $M^6$ parallel to the conduit M. In other words, the branch conduits for the successive machines are connected in multiple between the main outgoing conduit M and the return conduit $M^6$. A pump O driven by an electric motor O' is located in the return conduit $M^6$ and propels the liquid therein through a heater $O^2$ and then back to the conduit M. This establishes a circulating system for the water in the jackets which is maintained at a substantially constant predetermined temperature by the heater $O^2$. The temperature drop of the liquid in passing through the cycle is regulated by the speed of propulsion of the liquid which, in turn, is regulated by a by-pass conduit $O^3$ and a valve $O^4$ therein for variably restricting the same. A flow meter P indicates the speed of travel in the return conduit adjacent to the pump and the timing of each complete cycle. Inasmuch, however, as the pairs of machines are connected in multiple between the conduits M and $M^6$ at different points in the length thereof, the temperature of the liquid will not be exactly the same at each of these points. We, therefore, preferably place a flow meter P' and restricting valve $P^2$ in the return conduit from each pair of machines, so that the rate of flow of liquid therethrough can be varied. This renders it possible to obtain substantially the same temperature drop in the branch conduits of each pair of machines so that the temperature of the wax holding conduit will be substantially uniform throughout the series. The wax traveling through the conduit I is placed under a predetermined pressure by the operation of the pump $L^4$. Within the branch conduits M' the conduit I has an up-flow portion I' into one of the branches of the Y, a portion $I^2$ from this branch to the other branch and a down-flow portion $I^3$ to the conduit M. In the latter is a portion extending to the next branch conduit M' in which are arranged portions similar to I', $I^2$ and $I^3$ and so on to the end of the series. Between the portions I', I² and also between the portions I, I² are fittings I⁴ connecting with flexible hose conduits I⁵ leading to the chamber J⁴ within each member J. As all of these portions of the conduit I are enclosed within the water jacket, the temperature of the wax is maintained at a point where it is sufficiently plastic to flow. Preferably the temperature of the wax when passing through the coupling J' into the mold is somewhat lower than the temperature while passing through the pump L⁴. This maintains the wax sufficiently viscous when entering the mold to avoid danger of mixing with the air in the mold cavity.

Hydraulic operating means for individual molding machines

The sequence of operations necessary in each machine is: (1) closing and clamping the mold; (2) engaging the cores with the mold (if any are used); (3) coupling the socket J' with the nipple F²; (4) opening the valve J⁵ to permit ejection of the wax through the coupling and nipple into the mold; (5) closing the valve J⁵; and (6) disengaging the coupling J' from the nipple F², withdrawing the cores and opening the mold. These last three operations may be substantially simultaneous without detriment. The hydraulic operating means for accomplishing the above sequence of operations is of the following construction. Q is a container for the hydraulic fluid. Q' is a pump operated by a motor Q². R is a conduit for the fluid propelled by the pump which extends throughout the length of the series of machines. Branch conduits R' from the conduit R lead to each machine and contain a flow control valve R² and a manually controlled valve S. The latter is preferably a four-way valve and has a plurality of conduits leading therefrom to different hydraulic cylinders of the machine. One conduit T leads to the outer end of the cylinder E and contains a sequence valve T'. From this valve a conduit T² extends to the outer end of one of the cylinders H² and another conduit T³ extends to the other cylinder H². In the conduit T³ is a sequence valve T⁴ from which a conduit T⁵ leads to the outer end of the cylinder K. Thus, assuming the valve S is in a position to admit fluid to the conduit T, it will first pass to the cylinder E and operate the piston E' to close the mold. When sufficient pressure is attained in this conduit, fluid will pass from the sequence valve T' into the conduits T² and T³ to the outer ends of the cylinders H² operating the pistons H' therein against the resistance of the springs H⁵ and moving the cores into engagement with the mold. Again when pressure rises in the conduit T³ fluid will pass from the sequence valve T⁴ to the outer end of the cylinder K operating the piston K' therein which, first, engages the socket coupling J' with the nipple F² and, second, operates the valve J⁵ to permit flow of wax through said coupling into the mold. When the valve S is moved into another position, fluid will pass through a conduit T⁶ containing a sequence valve T⁷ to the inner end of the cylinder K so as to withdraw the piston K', close the valve J⁵ and disengage the socket J' from the nipple F². After rise of pressure in the conduit T⁶, fluid will pass from the sequence valve T⁷ to the lower side of the cylinder E moving the piston E' upward and opening the mold. This same position of the valve S connects the conduit T with an exhaust conduit T⁸ so that the pistons K' and E' may be operated as just described and the springs H⁵ will return the pistons H' to their outward positions. In the normal position of the valve S, all of the conduits T, T', etc., are cut off from the conduit R² so that the machine remains stationary.

Complete operation

In the full operation of the apparatus, an attendant is positioned adjacent to each of the machines in convenient relation to the controlling valve S thereof. Each operator may then successively mold plastic article by moving the valve S through its several positions and after the mold is reopened, the molded article may be easily removed therefrom. This is for the reason that the chilling of the wax in the mold is sufficient to render it rigid so that it will not be distorted when handled.

What I claim as my invention is:

1. In a molding machine for plastic material which is plastic only within narrow temperature limits, the combination with a frame, of a mold formed in separable sections positioned on said frame, means for supplying molding material heated to plasticity and under pressure, said means including a nozzle movably mounted on said frame into and out of coupling engagement with said mold, a valve normally closing said nozzle, a fluid motor for opening and closing said mold, a second fluid motor for operating said nozzle and valve including a resiliently yieldable connection between the movable element of said motor and said nozzle to effect the coupling of the latter with said mold, a tappet operated by said motor subsequent to the coupling of said nozzle for opening said valve, resilient means operating upon the withdrawal of said tappet for closing said valve in advance of the uncoupling of said nozzle, and controlling means for said motors adapted to close said mold in advance of the coupling of said nozzle and to open said mold subsequent to the uncoupling of said nozzle.

2. In a molding machine for plastic material which is plastic only within narrow temperature limits, the combination with a frame, of a mold formed in separable sections positioned on said frame, means for supplying molding material heated to plasticity and under pressure, a nozzle connected to said means and movably mounted on said frame into and out of coupling engagement with said mold, a valve normally interrupting flow of plastic material from said nozzle, a reciprocating fluid motor adapted in one phase of its movement to couple said nozzle to said mold, a resiliently yieldable connection between said motor and nozzle permitting the continued movement of the former after the coupling of the latter to said mold, a tappet operated by the continued movement of said motor to open said valve and permit discharge of plastic material into said mold whereby in the return movement of said motor said valve is closed in advance of the uncoupling of said nozzle, and means for closing and opening said mold respectively in advance of and subsequent to the operation of said motor.

3. Molding apparatus for plastic material which is plastic only within narrow temperature limits comprising a series of pairs of oppositely facing molding machines, a container for molding material, a conduit connected to said container and having a main portion extending between said molding machines the length of the series, a branch conduit extending from said main conduit into proximity to each of said molding machines, means for propelling said molding material through said conduits under predetermined pressure, a jacket conduit surrounding said main conduit and each of said branch conduits for holding a fluid heating medium, a return conduit for the fluid heating medium including a main conduit extending between said machines and branch conduits connected to each of said branch jacket conduits, means for circulating the fluid medium through said jacket conduits and return conduits, means for heating said fluid medium at one point in its cycle, means for regulating the velocity of flow of the total fluid in said main conduits, and means for independently regulating the velocity of flow of fluids through each of said branch conduits.

RODNEY E. CHRISTIAN.

REFERENCES CITED

The following references are of record in the file of this patent:

UNITED STATES PATENTS

| Number | Name | Date |
|---|---|---|
| Re. 18,202 | Polak | Sept. 22, 1931 |
| 133,229 | Hyatt et al. | Nov. 19, 1872 |
| 791,648 | Richards | June 6, 1905 |
| 2,111,857 | Jeffery | Mar. 22, 1938 |
| 2,259,181 | Shaw et al. | Oct. 14, 1941 |
| 2,309,729 | Gordon | Feb. 2, 1943 |
| 2,359,839 | Goessling | Oct. 10, 1944 |
| 2,374,069 | Balthis | Apr. 17, 1945 |